United States Patent
Kowalczyk et al.

[11] Patent Number: 5,949,036
[45] Date of Patent: Sep. 7, 1999

[54] DOUBLE LINEAR MOTOR AND ELEVATOR DOORS USING SAME

[75] Inventors: Thomas M. Kowalczyk, Farmington; Zbigniew Piech, East Hampton, both of Conn.

[73] Assignee: Otis Elevator Company, Farmington, Conn.

[21] Appl. No.: 09/176,584

[22] Filed: Oct. 21, 1998

[51] Int. Cl.[6] .......................... B66B 13/14; H02K 41/00; E05C 7/06
[52] U.S. Cl. .............................. 187/316; 310/12; 310/13; 49/118
[58] Field of Search .................................. 187/316, 289; 49/117, 118, 120, 100; 310/12, 13

[56] References Cited

U.S. PATENT DOCUMENTS

| 5,587,566 | 12/1996 | Barten et al. | 187/316 |
| 5,736,693 | 4/1998 | Piech et al. | 187/316 |
| 5,808,246 | 9/1998 | Peruggi et al. | 187/316 |

FOREIGN PATENT DOCUMENTS

| 2603681 | 8/1977 | Germany | 310/12 |
| 4103257 | 8/1992 | Germany | 310/12 |
| 2281664 | 3/1995 | United Kingdom | 310/12 |

Primary Examiner—Robert E. Nappi

[57] ABSTRACT

A single linear motor has two sets of active sides with windings, secondaries and backirons. The front of the motor drives one load and the rear of the motor selectively drives another load. The windings on the two sides may have their phases reversed so as to drive the load in opposite directions in response to the same three-phase, U, V, W drive signals; or, only one load need be drive at any one time. The loads may be double, center-opening or two-speed elevator doors.

18 Claims, 4 Drawing Sheets

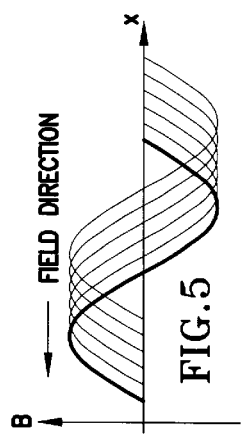
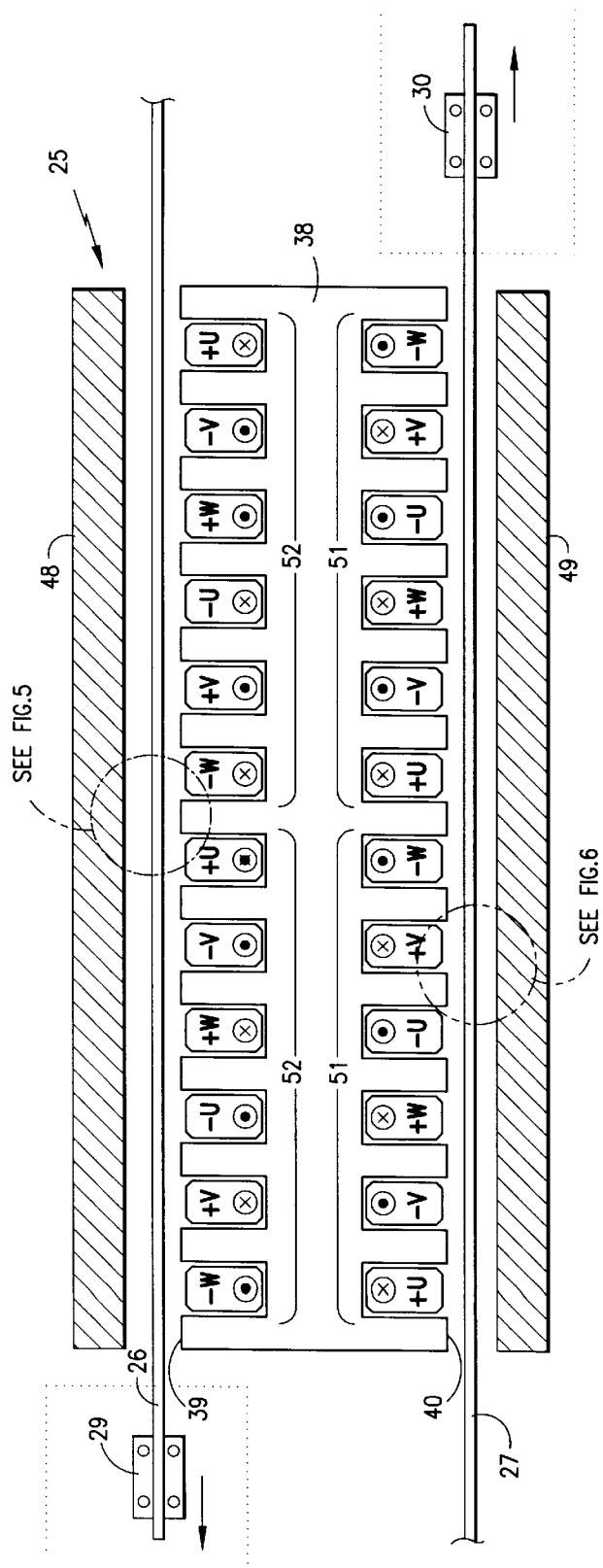
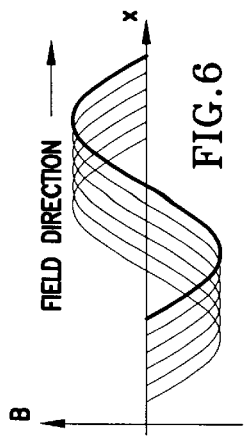

DOUBLE LINEAR MOTOR AND ELEVATOR DOORS USING SAME

TECHNICAL FIELD

This invention relates to a single linear motor which drives a pair of secondaries independently, or in the same or opposite directions, and operating center-opening, double or two-speed elevator doors, directly, with a single linear motor and motor drive.

BACKGROUND ART

Elevator car doors have historically been driven by rotary motors through complex linkages. For center-opening double doors, the complexity of the linkage is even greater. Additionally, rotary door openers are difficult to install and require frequent, costly maintenance.

Some more recent elevator doors employ linear motors wherein the force created between the primary and the secondary is applied directly to the elevator doors to produce corresponding linear motion. An example is illustrated in U.S. Pat. No. 5,509,504. While linear door operators are more reliable, requiring little if any maintenance, they are expensive. For double door configurations, options include having a motor including primary, secondary, backiron and drive system for each of the door panels; but this is doubly expensive. Another option is to use a single motor to move one panel and relate the other panel to it, with a cable or the like; but such a system is far more difficult to control. Another option is to place the primary on one door panel and the secondary on the other door panel; this requires both parts of the motor to move, increasing the moving mass in the door system and requiring a moving cable to the motor winding. Two-speed door sets require one motor mounted on the slow door to drive the fast door and one motor mounted on the cab (or on the slow door) to drive the slow door, or single motors using relating cables.

DISCLOSURE OF INVENTION

Objects of the invention include individual linear motors capable of driving loads in opposite directions; individual linear motors capable of alternatively driving one load, two loads in the same direction, or two loads in opposite directions; linear motors capable of robustly driving loads in two directions with a single power source; and practical, less expensive and reliable operators for double and two-speed doors, including elevator doors.

In accordance with the present invention, a linear motor has primary windings which can be operated in response to a single motor power source, such as an inverter, or can be operated either in series or parallel, while providing force in the same or opposite directions upon corresponding ones of a pair of independent secondaries, disposed on opposite sides of the primary. In accordance further with the invention, each side of the primary may have conventional windings independent of the conventional windings of the other side which can be operated independently to drive only one secondary at a time. Individual windings for each phase may cross over from one side to the other, or the windings may comprise a combination of crossover windings and independent windings. In still further accord with the present invention, the independent windings may be so arranged that when driven with the same power source, either in series or in parallel, they will drive independent loads in opposite directions, or, if desired, in the same direction, or while one load is being driven and the other is not, selectively. Other winding configurations, involving crossover windings that serve both sides of the single primary may be fashioned so as to drive independent loads on opposite sides thereof in mutually opposite directions, or if desired could be configured to independently drive the loads in the same directions.

According to the present invention, an elevator car door operator has a single linear motor having two independent sets of primary windings which are energized to produce force in opposite directions upon a pair of corresponding independent secondaries, each of which is attached to one of the doors. Doors of the invention can be driven accurately by driving the windings for both directions in series from a single power source. Center-opening and two-speed double doors are readily driven with the motor of the invention. In addition to being less expensive, a door operator of the invention can be shipped more economically and in a smaller size package. The simplicity results in a reduction of additional parts, such as brackets and mounting hardware, which are also eliminated. The unit is easily installed and can be applied readily to existing equipment. The door operator of the invention is more reliable and easier to maintain.

In addition to elevator doors, there are other forms of doors, and other types of loads altogether, which can benefit from the ability to use a single linear induction motor to simultaneously drive two loads in opposite directions, and to have the ability to select modes of operation, such as driving either load singly, or both at the same time, and even the capability to select directions of movement of two loads driven by a singular linear induction motor.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 4 is a partial, top plan, sectional schematic view taken on the line 4—4 of FIG. 1.

FIGS. 5 and 6 are waveforms illustrating flux as a function of distance at designated parts of FIG. 4, including the direction in which the field advances.

BEST MODE FOR CARRYING OUT THE INVENTION

Figure 1:
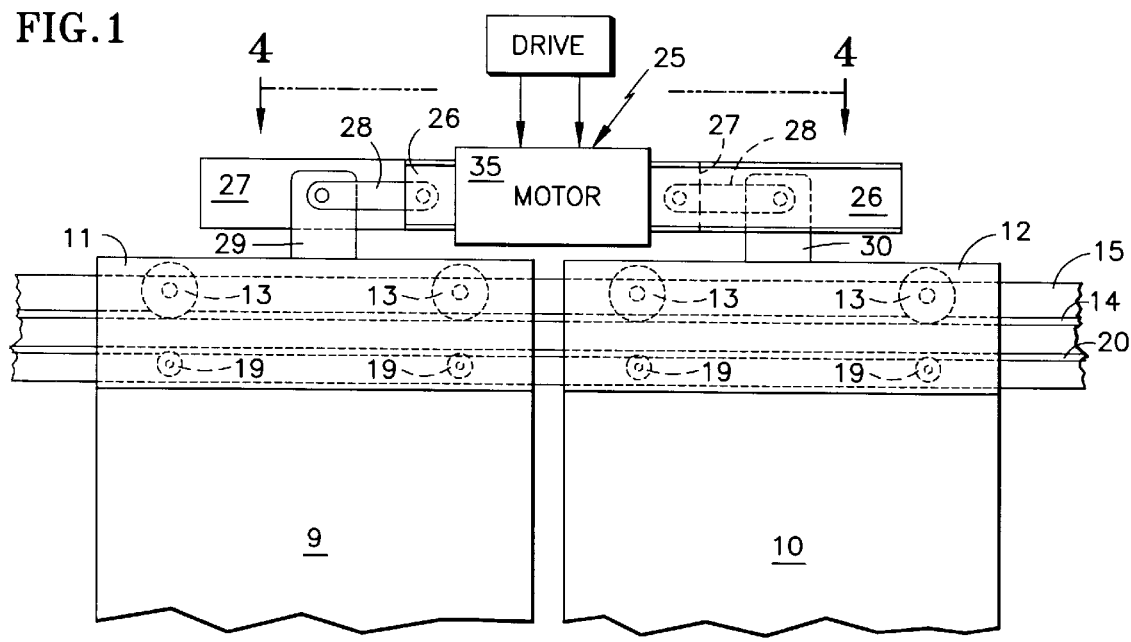
FIG. 1 is a partial front elevation view of a center-opening door operator according to the invention.

A classic example of a use for a bidirectional singular primary, linear motor is in operating center-opening, double doors of an elevator. Referring to FIG. 1, a pair of center-opening elevator doors 9, 10 are shown in an almost-closed position. Each of the doors is fastened to a door hanger 11, 12 which is supported by mutually opposing rollers 13 which roll on a track 14 supported by a brace 15 fastened to the lintel above the elevator car door opening. The doors 9, 10 are stabilized by rollers 19 that are guided by a rail 20 disposed on the brace 15. The description thus far is of apparatus known to the art.

Figure 2:
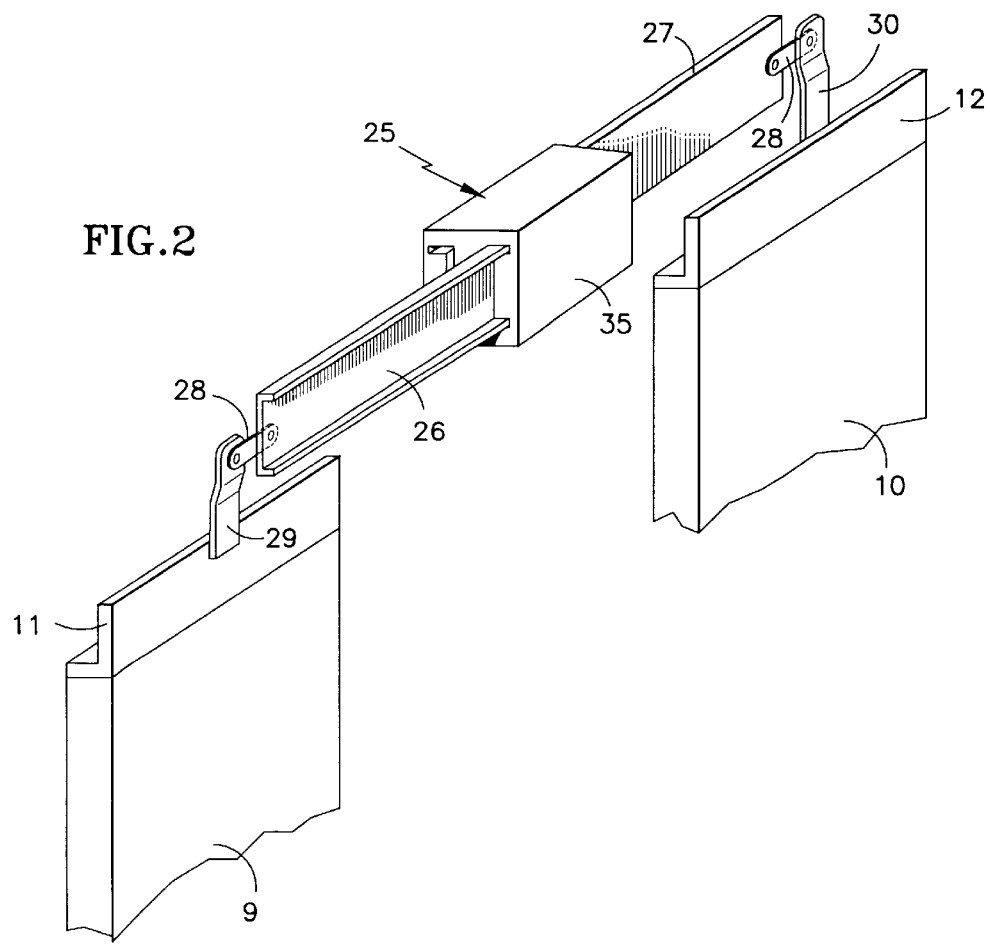
FIG. 2 is a partial perspective view of the door operator of FIG. 1.

According to the present invention, a single linear motor 25 is fastened to the lintel or otherwise to the building in any suitable way. As seen more clearly in FIG. 2, the motor 25 has two secondaries 26, 27 each connected by a suitable link 28 and bracket 29, 30 to a corresponding one of the door hangers 11, 12. When the door 9 is closed, the secondary 26 is disposed within the motor 25 and over that portion of the elevator door opening that relates to the door 10. But when the door 9 is opened, the secondary 26 is disposed within the motor 25 and above the elevator door opening. Similarly, when the door 10 is closed (FIG. 1), the secondary 27 is disposed within the motor 25 and above that portion of the elevator cab door opening which relates to the door 9; but when the door 10 is opened, the secondary 27 is disposed within the motor 25 and above the opening of the door 10.The motor 25 has a motor housing 35 shown in FIGS. 1 and 2 only.

Figure 3:
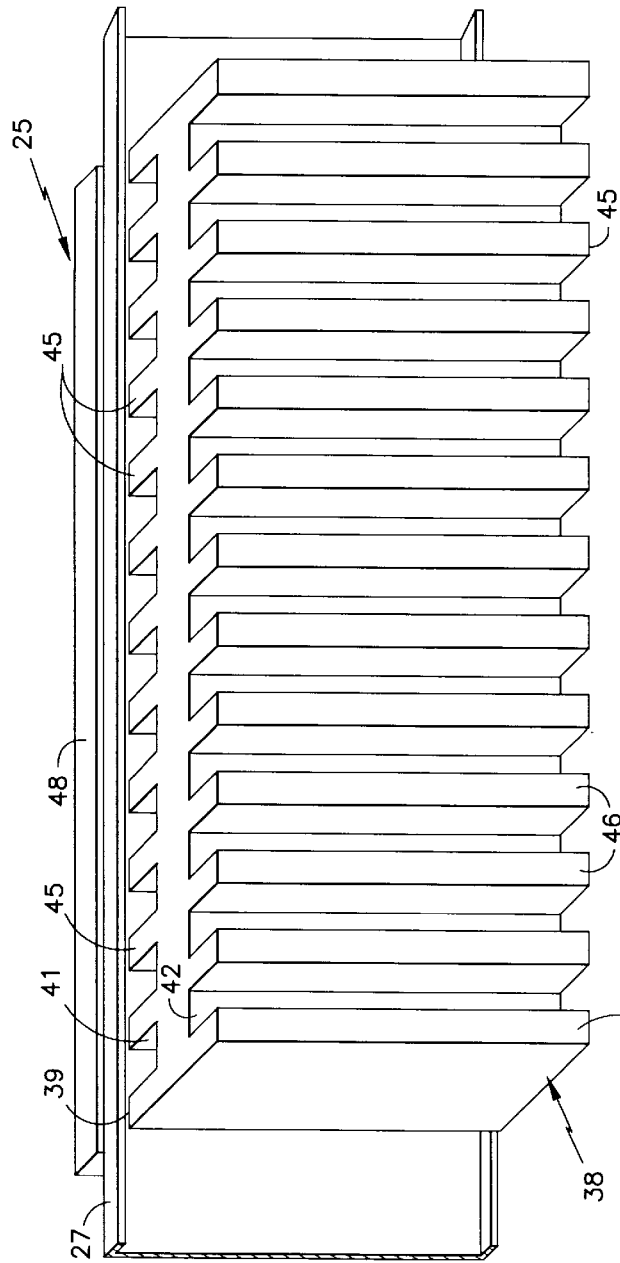
FIG. 3 is a partial perspective view of the motor of FIGS. 1 and 2.

In FIGS. 3 and 4, the core 38 of the motor 25, which is formed of permeable material, typically iron, has opposite face surfaces 39, 40 with slots 41, 42 formed therein so as to provide active areas 45, 46. Adjacent but spaced from the surface 39 is the conductive secondary 27. On the opposite side of the secondary 27 from the core 38 is a backiron 48. Similarly, the conductive secondary 27 is spaced adjacent to the surface 40, and a backiron 49 is spaced adjacent to the secondary 27. The backirons 48 and 49 are rigidly disposed with respect to the core 38. As depicted in FIG. 4, the secondaries 26, 27 are set up for operation in directions opposite to those shown in FIGS. 1 and 2.

In FIG. 4, coils are depicted with conventional dot and cross notation so as to indicate relative direction of current flow at a given moment in time. In each case, a coil for a pole U includes a plus U segment in which current would flow down and a minus U segment in which current would flow up at a given moment of time, and connections therebetween. For instance, a pair of coil sets 51 shown in FIG. 4 and FIG. 7 being driven with currents illustrated in FIG. 4 will drive the secondary 27 to the right, as illustrated by the flux versus distance waveform in FIG. 6. Coil sets 52 adjacent the opposite surface 39, with currents flowing as indicated, will drive the secondary 26 to the left, as illustrated by the flux versus distance waveform of FIG. 5. The relationship between the coil sets 51 and 52 is, however, irrelevant. For instance, in FIG. 7, similar coil sets 53 are driven slightly differently than the coil sets 52, which is however irrelevant since the coil sets 53 will produce the leftward force in the same fashion as the coil sets 52. The important thing is that the conventional UVW phase relationships on either side be maintained on that side so as to achieve the desired direction of force on the secondary.

Figure 7:
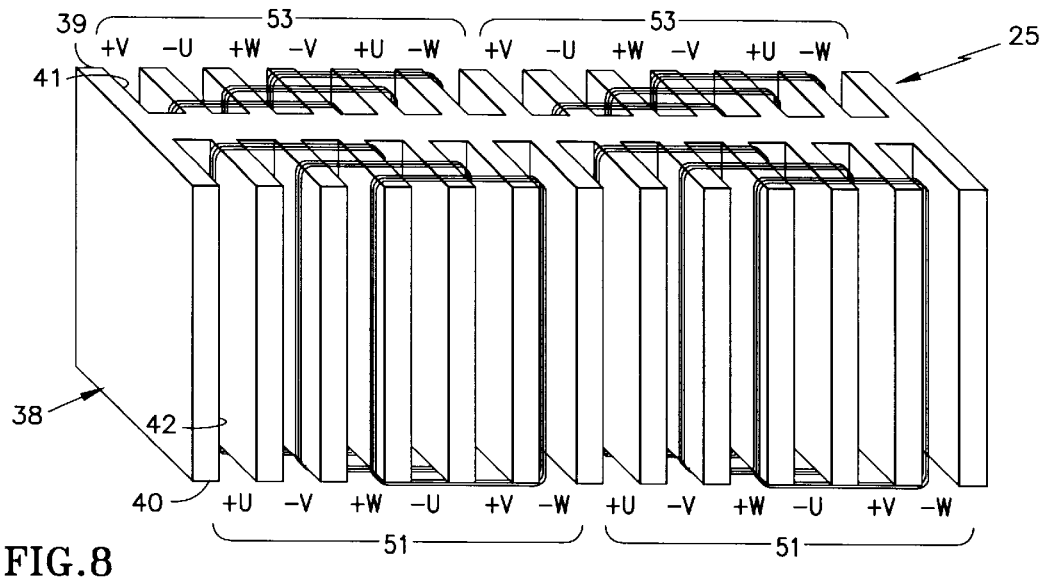
FIGS. 7–9 are partial, top plan views of the motor illustrating various winding configurations.

In FIGS. 4 and 7, the winding configurations consist of two, one-layer, overlapping, multi-phase winding configurations which are conventional in single sided flat linear induction motors known to the art. The windings may be driven in series or in parallel, a series connection generally being preferred in order to avoid excessive current and magnetic imbalance as between the various winding sets. In FIGS. 4 and 7, each set of windings is wound between slots adjacent to the same surface of the core, so all segments of each winding are on the same side of the core.

Figure 8:
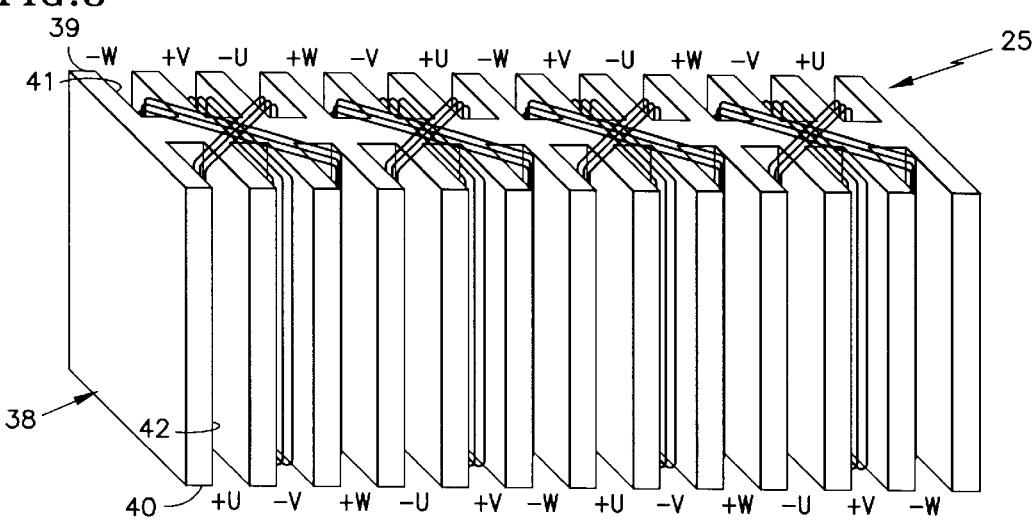
Figure 9:
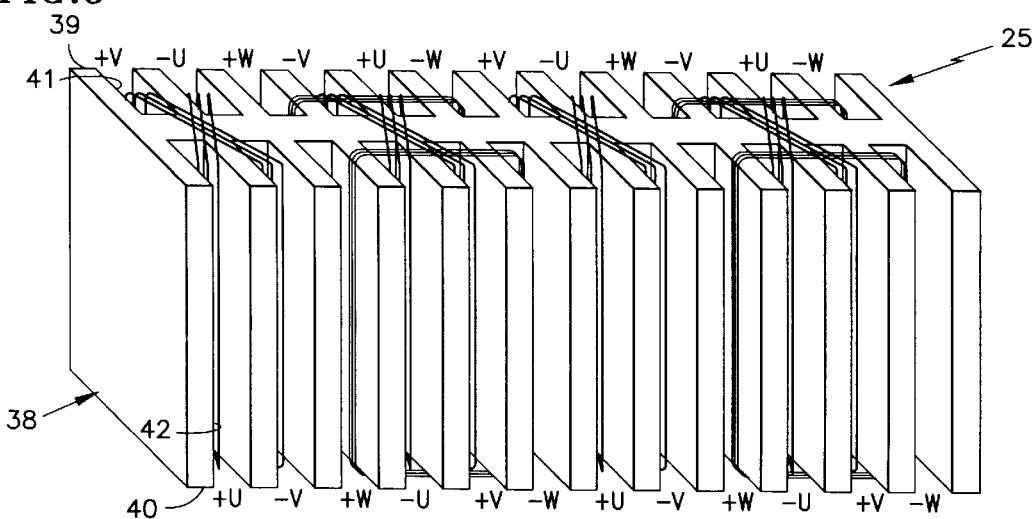

In FIG. 8, the windings cross over from slots 41 adjacent one surface 39 of the core 38 to slots 42 adjacent the other surface 40 of the core 38, as shown. In FIG. 8, some segments of each winding are on one side of the core, some segments of each winding are on the other side of the core, and some segments of each winding cross over from one side to the other. The connections are made in a manner to provide current flow, at any instant of time, for each phase segment the same as that shown in FIG. 4. Thus, at a given point in time, current will be flowing upwardly through the slot −W, as current is flowing downwardly in the slot +V, and current is flowing upwardly in the slot −U, etc. In this case, each slot has the same phase segment designation as the corresponding slot of FIG. 4.

The invention may also be practiced with some windings crossing over from slots 41 on one side to slots 42 on the other side, while other windings are formed between slots 41 on the same side or slots 42 on the same opposite side. And, other configurations are possible.

The configuration of FIG. 7 has significance since it is capable of having only the coils of slots 41 or slots 42 connected to the power source so that only one load is driven, or having both connected to the power source so that both loads can be driven. The configuration of FIG. 7 could be modified so as to have the coils 53 phased the same as the coils 51 and then have the capability to drive two loads in the same direction or either one of the loads at any one time being driven in that direction. On the other hand, the configuration of FIG. 8, which is committed to driving two loads in opposite directions, has a much higher ratio of active copper versus wasted copper, and therefore will produce less waste heat than the embodiment of FIG. 7. Thus, in configurations limited to always driving two loads in opposite directions, the configuration of FIG. 8 is to be preferred, whereas when selectivity of any sort is desired, the configuration of FIG. 7 (or a modification that is obvious to drive both loads in the same direction, selectively) is to be preferred.

Figure 10:
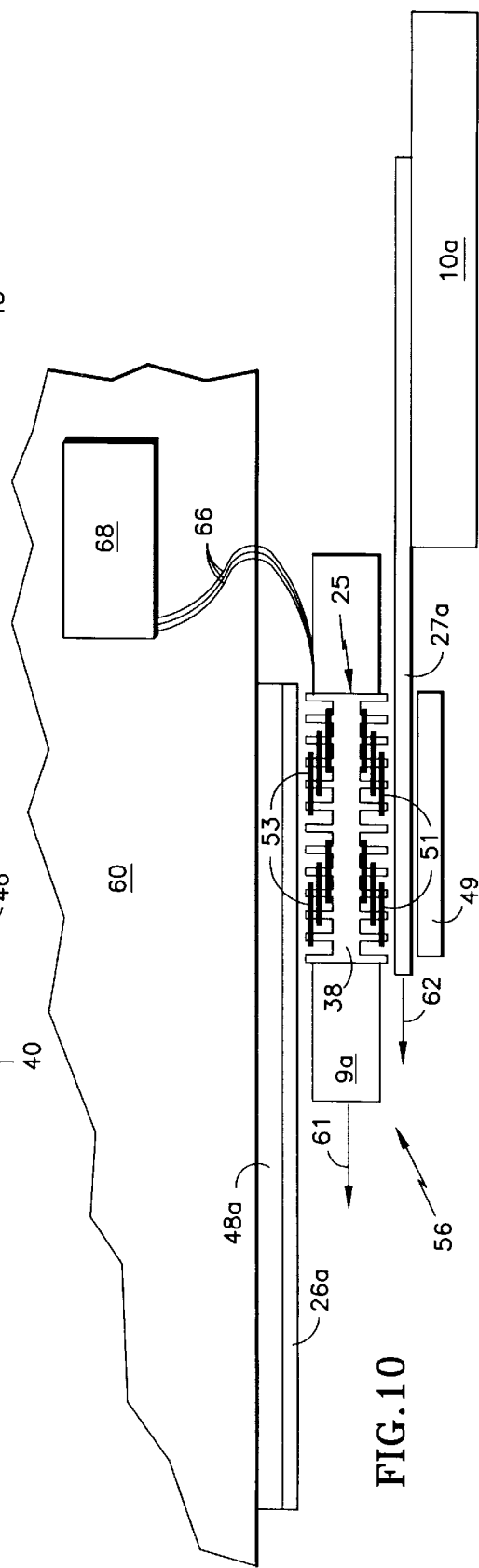
FIG. 10 is a partial, partially broken away top schematic view of a two-speed elevator door employing the present invention.

In FIG. 10, a two-speed elevator door system 56 includes a linear motor 25 of the type described, with a winding configuration the same as that described with respect to FIG. 7, disposed on a slow moving door 9a. The backiron 48a for the coil sets 53 is disposed rigidly to the elevator car 60, and the secondary 26a for the coils 53 is rigidly disposed to the backiron 48a. Therefore, in response to application of power to the coils 53, the entire motor 25 and the slow door 9a will move to the left as shown by an arrow 61, at a first speed determined by the parameters of the motor and the drive applied thereto. On the other hand, the backiron 49 for the coils 51 is mounted to the core 38, in the conventional fashion described with respect to FIGS. 1–4. The secondary 27a for the coils 51 is disposed to slide between the core 38 and the backiron 49 in a conventional way, and the fast door 10a is attached to the secondary 27a. Thus, when the coils 51 are energized, the secondary 27a will move with respect to the core 38 in the same direction and speed, as the core 38 moves with respect to the secondary 26a, so that the secondary 27a moves twice as fast with respect to the elevator car 60 as does the core 38, as shown by arrows 61, 62. The system of FIG. 10 thus provides a simple form of two-speed elevator door driver, the only disadvantage being that a flexible cable 66 is required to provide power from a source 68 disposed on the elevator 60 to the coil sets 51, 53 which move as the doors are opened and closed.

Instead of having the backiron 48a disposed directly on the elevator car 60, it could be supported to the core 38 in the same fashion as the backiron 49. However, in that case, the secondary 26a has to be suspended so that the space between the backiron 48a and the core 38 can slide along the secondary 26a, without interference. However, the configuration of FIG. 10 is preferred.

Although the motor of the present invention requires windings for two sides, the amount of material used in the windings, core, secondaries and backiron, and the amount of power applied thereto is no greater than is required for a single motor driving through linkages to separate doors, but the present motor is far simpler than two separate motors (one for each door) in that only a single core and a single electronic drive system is required to accommodate driving both doors directly.

Conventional guides, formed of any material having a suitable sliding surface, such as NYLATRON®, may be used to maintain proper clearance, as is known. The drive motor disclosed herein is but an example of a drive motor employing the invention. Obviously, the drawings are not all to a common scale. The secondaries 26, 27 may well be planar secondaries, and the system may take different forms. Core 38 could be of a different cross sectional configuration and may have different relative dimensions.

The foregoing patent is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A double linear motor for selectively driving first and second secondaries independently, comprising:

a magnetic permeable core having a first face surface on a first side of said core and a second face surface on a second side of said core opposite to said first side, a plurality of slots formed in each of said surfaces, and a plurality of multi-phase windings wound to have segments thereof in said slots forming magnetic poles at each of said first and second face surfaces;

a first conductive secondary adjacent to but spaced from said first face surface and moveable with respect to said core;

a second conductive secondary adjacent to but spaced from said second face surface and moveable with respect to said core independently of said first conductive secondary;

a first backiron adjacent to but spaced from said first secondary on a side thereof away from said core; and a second backiron adjacent to but spaced from said second secondary on a side thereof away from said core.

2. A motor according to claim 1 wherein:

some of said windings are wound to have all of their segments on said first side and the remainder of said windings are wound to have all of their segments on said second side.

3. A motor according to claim 2 wherein:

said windings on said first side of said core are wound to have the same mutual phase relationship to each other when viewed from said first side as the mutual phase relationship which said windings on said second side have, when viewed from said second side, whereby to drive said secondaries in mutually opposite directions.

4. A motor according to claim 2 wherein said windings on said first side are wound to be phase reversed, when viewed from the top, from windings on said second side, whereby to drive said secondaries in opposite directions.

5. A motor according to claim 2 further comprising:

a linear motor drive for supplying currents to at least the windings in slots of said first face surface for selectively driving the corresponding secondary in either one of two directions in dependence on the phase relationships of said currents; and wherein said windings on said first side are driven by said drive as said windings on said second side are selectively not driven, whereby to selectively drive only said first secondary.

6. A motor according to claim 1 wherein:

each of said windings is wound to have segments in a slot on said first side, segments that cross over from said first side to said second side, and segments in a slot on said second side.

7. A motor according to claim 6 wherein:

said windings are wound so as to provide magnetic poles on said first side and on said second side, said poles on said first side having polarity opposite to polarity of said poles on said second side, whereby to drive said secondaries in mutually opposite directions.

8. A motor according to claim 1 wherein:

some of said windings are wound to have all of the segments thereof on said first side, some of said windings are wound to have all of the segments thereof on said second side, and some of said windings are wound to have segments in a slot on said first side, segments that cross over from said first side to said second side, and segments in a slot on said second side.

9. A motor according to claim 1 wherein:

said windings are wound so as to provide magnetic poles on said first side and on said second side, said poles on said first side having polarity opposite to polarity of said poles on said second side, whereby to drive said secondaries in mutually opposite directions.

10. A double linear motor system for selectively driving first and second loads independently, comprising:

a magnetic permeable core having a first face surface on a first side of said core and a second face surface on a second side of said core opposite to said first side, a plurality of slots formed in each of said surfaces, and a plurality of multi-phase windings wound to have segments thereof in said slots forming magnetic poles at each of said first and second face surfaces;

a first conductive secondary adjacent to but spaced from said first face surface and connected to said first load, said first conductive secondary moveable with respect to said core;

a second conductive secondary adjacent to but spaced from said second face surface and connected to said second load, said second conductive secondary moveable with respect to said core independently of said first conductive secondary;

a first backiron adjacent to but spaced from said first secondary on a side thereof away from said core; and a second backiron adjacent to but spaced from said second secondary on a side thereof away from said core.

11. A motor according to claim 10 wherein:

said first and second loads are mutually adjacent doors.

12. A motor according to claim 11 wherein:

said doors are elevator doors.

13. A motor according to claim 12 wherein:

said core is disposed on an elevator car and said doors comprise a pair of center-opening double doors.

14. A motor according to claim 12 wherein:

said core is disposed on a slow speed door of a two-speed set of elevator doors.

15. A double linear motor system, comprising:

a linear motor primary having a first face surface and a second face surface on an opposite side of said motor from said first face surface, a permeable core with a plurality of electric windings interconnected in multi-phase relationship along said first face surface, said core having a second set of electric windings interconnected in multi-phase relationship along said second face surface;

a first secondary having a first planar surface adjacent to said first face surface and a second planar surface on the opposite side of said secondary from said first planar surface, and moveable with respect to said primary;

a first backiron adjacent to said second planar surface, and extending at least over an area coextensive with said first face surface;

a second secondary having a third planar surface adjacent to said second face surface and a fourth planar surface on the opposite side of said secondary from said third planar surface and moveable with respect to said primary independently of said first secondary;

a second backiron adjacent to said fourth planar surface, and extending at least over an area coextensive with said second face surface; and a multi-phase linear motor drive for supplying currents to said windings to selectively cause said secondaries to move in either of two directions, said windings being driven in multi-phase relationship, to produce force at said first face surface which is opposite to force produced at said second face surface, whereby to drive said secondaries in opposite directions.

16. A system according to claim 15 additionally comprising:

a pair of elevator doors, each affixed to one of said secondaries, whereby to be moved in mutually opposite directions by said secondaries.

17. A system according to claim 16 wherein:

said core is disposed on an elevator car and said doors comprise a pair of center-opening double doors.

18. A system according to claim 16 wherein:

said core is disposed on a slow speed door of a two-speed set of elevator doors.

* * * * *